United States Patent

[11] 3,634,837

[72] Inventors Peter Charles Ridgway
Middlesex;
Brian Charles Callcut, Berkshire, both of England

[21] Appl. No. 810,574
[22] Filed Mar. 26, 1969
[45] Patented Jan. 11, 1972
[73] Assignee Sperry Rand Limited
London, England
[32] Priority Apr. 4, 1968
[33] Great Britain
[31] 16,149/68

[54] HEAD MOUNT FOR MAGNETIC DRUM STORAGE DEVICES

10 Claims, 4 Drawing Figs.

[52] U.S. Cl. 340/174.1 E, 179/100.2 CA
[51] Int. Cl. G11b 5/60, G11b 21/20
[50] Field of Search 179/100.2 CA, 100.2 P; 340/174.1 E, 174.1 F

[56] References Cited

UNITED STATES PATENTS

| | | | |
|---|---|---|---|
| 2,862,781 | 12/1958 | Baumeister | 179/100.2 |
| 3,039,102 | 6/1962 | Fuller et al. | 179/100.2 |
| 3,105,964 | 10/1963 | Kanamuller | 340/174.1 |
| 3,351,925 | 11/1967 | Van Lammeren et al. | 340/174.1 |
| 3,368,210 | 2/1968 | Zimmer | 340/174.1 |
| 3,170,149 | 2/1965 | Koskie et al. | 340/174.1 E |
| 3,191,165 | 6/1965 | Keel | 340/174.1 E |
| 3,219.988 | 11/1965 | Miller et al. | 340/174.1 E |
| 3,292,169 | 12/1966 | D'Alesandro et al. | 340/174.1 E |

*Primary Examiner*—Stanley M. Urynowicz, Jr.
*Assistant Examiner*—Vincent P. Canney
*Attorney*—S. C. Yeaton

ABSTRACT: A mounting device for a flying head or a flying block having a number of flying heads used with magnetic drum storage apparatus comprising stationary location means providing location points for the head or block in an operative position close to a drum. One of the location points has a fixed pivot adapted to allow the head or block universal pivotal freedom about the pivot. Another of the location points has a stop member positioned to engage an abutment on the head or block to limit its pivotal movement about a yaw axis.

INVENTORS
PETER C. RIDGWAY
BRIAN C. CALLCUT
BY
HP Terry
ATTORNEY

INVENTORS
PETER C. RIDGWAY
BRIAN C. CALLCUT
BY
H.P. Terry
ATTORNEY

HEAD MOUNT FOR MAGNETIC DRUM STORAGE DEVICES

This invention relates to magnetic drum storage devices for recording and reproducing electrical signals.

In magnetic drum storage devices the storage drum has an outer surface consisting of or coated with magnetic material, and is rotated at high speed in close proximity to recording and/or reading heads. To obtain high resolution of stored signals, it is desirable to make the spacing between the drum and the heads as small as possible.

To overcome difficulties in maintaining the small spacing, it has been proposed to mount the heads in devices such that each head is resiliently urged towards the drum, but is prevented from contacting the drum by a thin film of air entrained between the drum and head by the rotation of the drum. Heads carried on such mounting devices will be referred to hereinafter as "flying" heads.

This invention is concerned with an improved mounting device for a flying head or for a flying block including a number of heads.

Since the head or block is said to be flying, the aircraft terms pitch, roll and yaw, and leading and trailing edge, are used herein in the same senses as they are used for aircraft with respect to the direction of air flow beneath the head or block causing it to fly.

The invention provides a mounting device for a flying head or flying block, comprising stationary location means providing location points for said head or block in an operative position close to a drum, one of said location points comprising a fixed pivot adapted to allow the head or block universal pivotal freedom about said pivot, and another of said location points comprising a stop member positioned to engage an abutment on the head or block to limit pivotal movement of the head or block about a yaw axis.

The fixed pivot may be positioned in advance of the leading edge of the head or block. Said stop may be positioned adjacent the trailing edge of the head or block. The position of said stop may be adjustable so that the position of the head or block in yaw can be adjusted.

The mounting device preferably includes means for withdrawing the head or block from the drum, said means including a frame member capable of motion toward and away from the drum, adapted to engage the head or block in said "away" motion so as to withdraw it from the drum and to release the head or block in said "toward" motion.

A specific embodiment of the invention is shown in the accompanying drawings in which.

A T-section recording block 11 comprises a plurality of discrete recording heads (not shown) closely adjacent one another, formed into a single block by a nonmagnetic encapsulating material, each discrete head being separately operable. The recording heads face the peripheral surface of a rotatable drum 12 (FIGS. 1 and 4) which is coated with a magnetizable material. The drum rotates in the direction of the arrow (FIGS. 1 and 4) and causes a thin film of air to flow with it. This film of air is pressurized between the block 11 and the surface of the drum and forms an air cushion on which the block "flies." Since the air flows in the same direction as the drum, the block is regarded as though it were flying in the opposite direction. The block approaches closest to the drum on a radius R nearer the trailing edge of the block than the leading edge.

Figure 1:
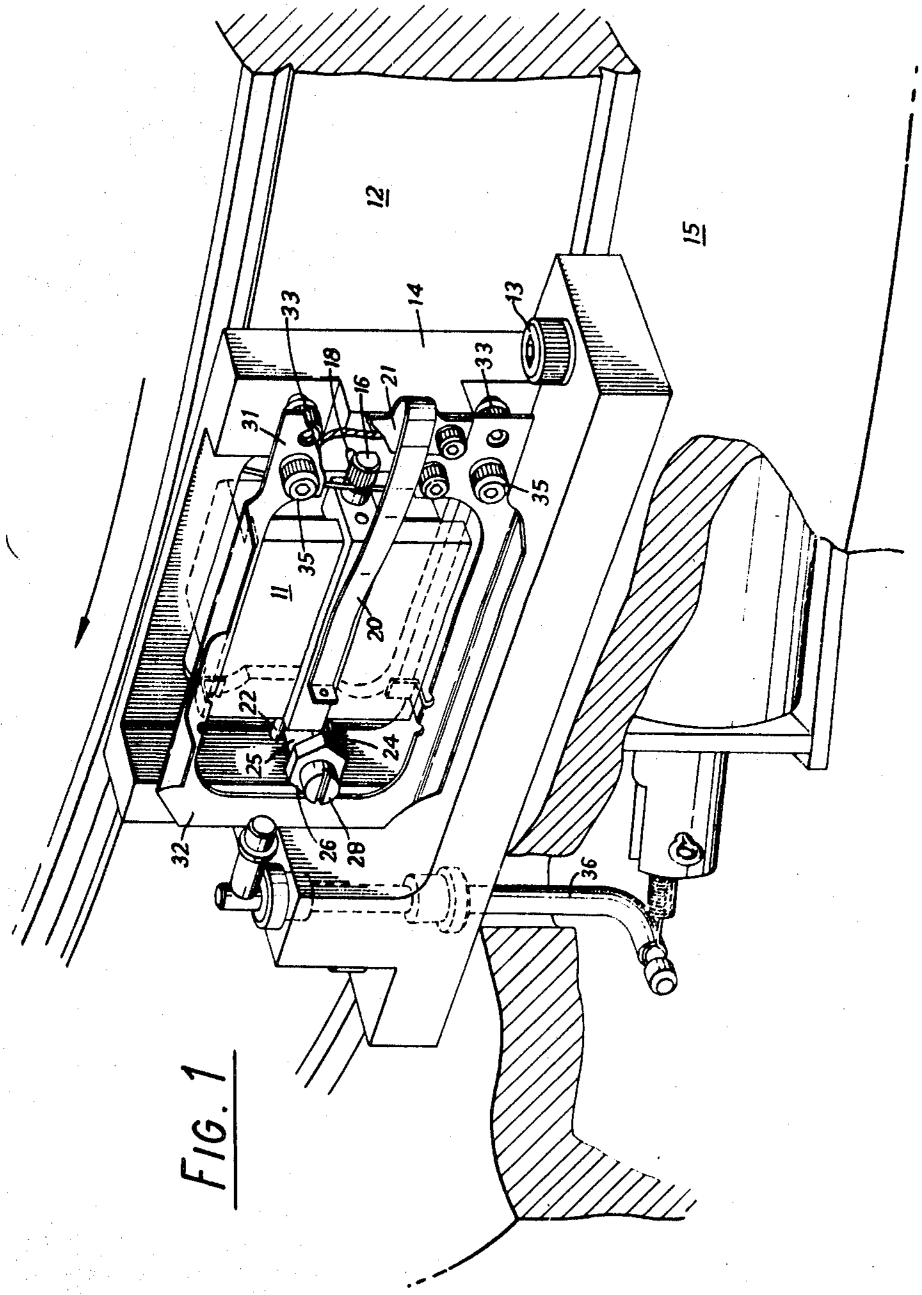
FIG. 1 is a view of a flying block mounting assembly.

The mounting for the block is designed to allow the block freedom to "fly" and, in flying, to adjust to small imperfections in the surface of the drum, but also to locate the block in substantially the same position after it has been removed to an inoperative position away from the drum and then replaced in the operative flying position shown in FIG. 1.

Figures 2, 3, 4:
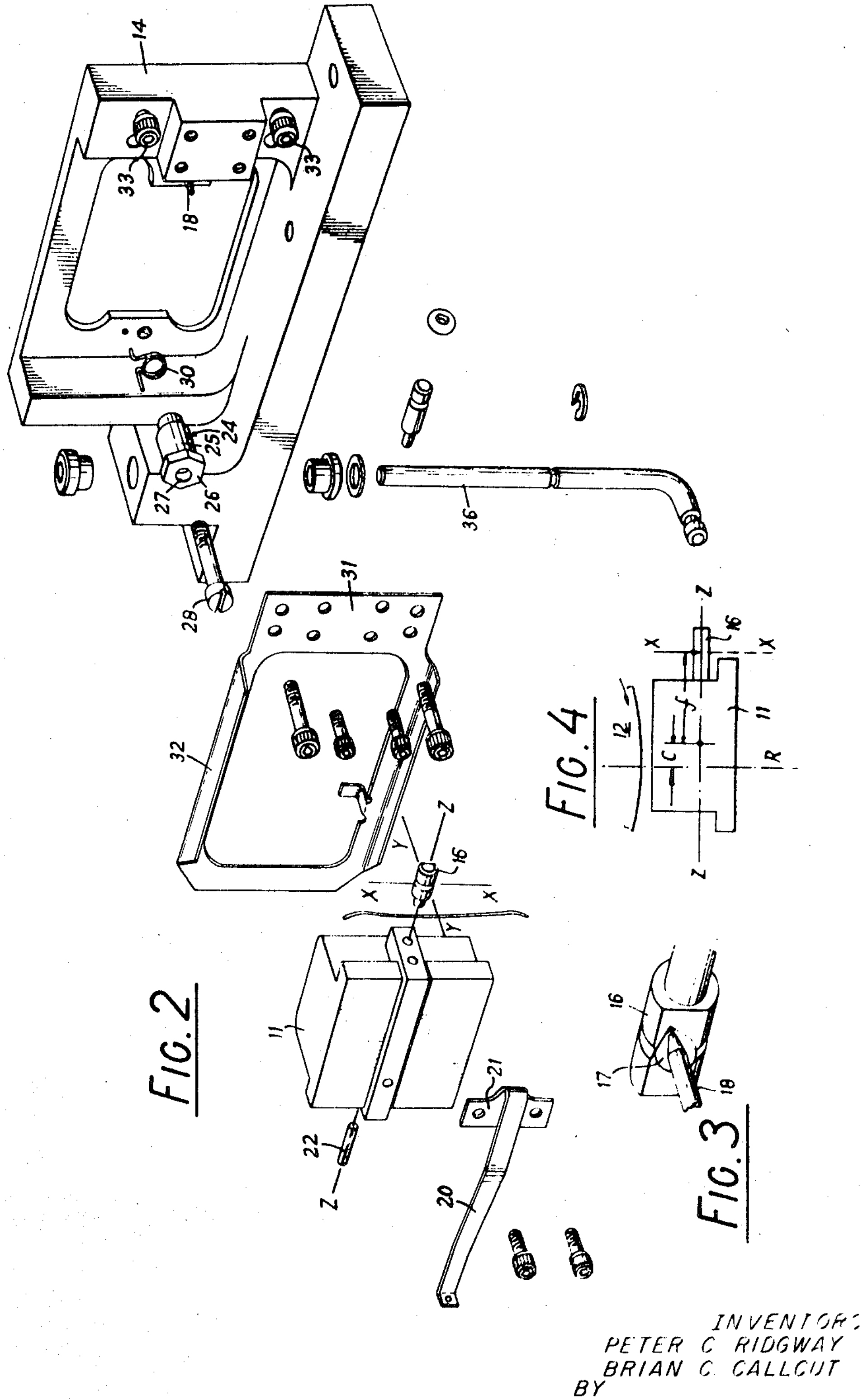
FIG. 2 is an exploded view of the flying block and mounting of FIG. 1.
FIG. 3 is a detail of a needle pivot device of the assembly.
FIG. 4 is a plan diagram of the block and its pivot.

The mounting assembly comprises a rigid, stationary part 14, which in use is screwed at 13 to a stationary platform 15 (FIG. 1). A single screw is used, allowing the part 14 to be angularly adjusted about the position of the screw. A generally rectangular opening in the part 14 allows the block 11 to be moved therethrough toward and away from the drum surface. At its leading edge the block 11 has a stub extension 16, in which is formed a conical opening 17 facing the drum (FIG. 3). A needle 18 of hardened steel is seated in a blind hole in the stationary part 14 with its pointed end pointing away from the drum and engaging in the conical opening 17 as shown in FIG. 3. The needle therefore forms a stationary pivot point for the block 11 allowing the block universal pivotal freedom.

The plan diagram of FIG. 4 shows the position of the pivot point relative to the block and drum. This position affects the mechanical stiffness of the arrangement, and it can be shown that a maximum stiffness is achieved when $f=\rho 2/C$ where $f$ = distance of pivot from the center of mass of the block C = distance of radius R from the center of mass of the block $\rho$ = radius of gyration of the block.

For the specific embodiment shown the distance $f$ is close to but rather longer than that giving maximum stiffness.

A leaf spring 20 has one end 21 secured to the stationary part 14 and the other end bearing against the block 11 approximately at the center of its rear face in the sense to urge it toward the drum 12. An optional feature is an adjustment screw (not shown) engaging the spring and the stationary part 14 to adjust the pressure applied to the block 11.

At the trailing edge of the block 11, opposite to the extension 16, a short rod 22 extends from the block. Mounted on the stationary part 14 adjacent the rod 22 is a cam member 24. The cam member comprises a cylindrical shaft 25 with a hexagon head 26 at one end. An opening 27 (FIG. 2) is drilled off center with respect to the shaft 25. The cam member is mounted on the stationary part 14 by means of a screw 28 passing through opening 27. A coil spring 30 (FIG. 2) encircles the cam member and engages round the short rod 22 so as to urge it into contact with the cylindrical cam face of shaft 25. The location of the block 11 in yaw about axis YY (FIG. 4) is therefore determined by the point of contact of rod 22 and shaft 25. This point is adjustable by loosening screw 28 and rotating the shaft 25 by means of the hexagon head 26. Since the shaft 25 is off center with respect to the screw 28, this rotation effects a change in the position of rod 22.

The block 11 is therefore located by a fixed point defined by the needle 18 and a point defined by the cam member 25, but is relatively free to move in pitch about axis XX (FIGS. 2 and 4), and in roll about axis ZZ (FIGS. 2 and 4). The block therefore is able to respond to variations in the pressure of the film of air between the block and the drum by pitching and/or rolling, so adjusting its position to clear small irregularities on the surface of the drum.

In order to withdraw the block 11 from the drum to an inoperative position, a thin spring metal frame 32 is used. This frame surrounds the block 11, but in the flying position of the block does not touch it. One side 31 only of the frame is screwed to a side of the stationary part 14 and the frame can be sprung towards and away from the drum, pivoting about its points of attachment to the stationary part. When the frame 32 is sprung away from the drum, a pair of ears engage the block 11 and pull it away from the drum to the inoperative position. When the frame 32 is sprung toward the drum, the pressure of leaf spring 20 causes the block to follow the frame until the pressure of the air film between the drum and the block equals the spring pressure and prevents further movement of the block. The frame continues, however, to move a small distance toward the drum so that the ears lose contact with the block which is left free and flying.

It is important that the block face be presented substantially flat to the drum as it approaches its flying position. This is because the air pressure is caused by the interaction between the block face and the drum. If, for instance, the block were presented to the drum with one corner in advance of the others, then insufficient air pressure would be generated to equal the spring pressure and that corner would dig into the surface of the drum. In order to adjust the position of the block as it follows the frame 32 toward the drum, the frame itself is adjustable. Short screws 33 extend between the stationary part 14 and the underside of the frame 32. By first adjusting the length of these screws extending from part 14 and then tightening screws 35 by which the frame is secured to part 14, the angle at which frame 32 lies is adjusted.

The pivoting movement of frame 32 to move the block to and from the drum is effected through a solenoid-operated lever 36, the lever engaging the free end of the frame 32.

The flying position location points for the block are defined by structure which does not move when the block is moved to and from the drum. The block therefore tends to take up substantially the same position whenever it is presented to the drum. This is of importance since the information stored on the drums is very closely packed and each head must be located within close limits relative to its respective information store. If, for instance, the location points were to move with the block, difficulty would be found in returning them to precisely the same position after each movement.

We claim:

1. A mounting device for a flying head or block comprising a stationary structure to which is rigidly fixed a universal pivot on which the head or block is mounted with universal freedom and a stop member on said stationary structure positioned to locate said head or block about the yaw axis of the head or block, said pivot and said stop member providing the only location points for the head or block in its operative position.

2. A mounting device as claimed in claim 1, wherein said universal pivot is a needle rigidly fixed in said stationary structure and having its pointed end seated in a conical opening in the head or block.

3. A mounting device for a flying head or block comprising a stationary structure to which is rigidly fixed a universal pivot on which the head or block is mounted with universal freedom at a position in advance of the leading edge of the head or block and a stop member on said stationary structure positioned in rear of the trailing edge of the head or block to locate it about the yaw axis, said pivot and said stop member providing the only location points for the head or block in its operative position.

4. A mounting device as claimed in claim 3, wherein said stop member is adjustable on said stationary structure in the direction of yaw movements of the head or block.

5. A mounting device for a flying head or block comprising stationary structure providing a universal pivot on which the head or block is mounted at a position in advance of the leading edge of the head or block and a stop member on said stationary structure positioned in rear of the trailing edge of the head or block to locate it about the yaw axis, said pivot and said stop member providing the only location points for the head or block in its operative position, wherein said stop member is adjustable on said stationary structure in the direction of yaw movements of the head or block, and comprises a cylindrical surface and a tension spring between the cylindrical surface and the head or block, said stop member having an opening off center with respect to the cylindrical surface and means passing through said offcenter opening to secure the stop member to said stationary structure.

6. A mounting device for a flying head or block comprising a stationary structure to which is rigidly fixed a universal pivot on which the head or block is mounted with universal freedom and a stop member on said stationary structure positioned to locate said head or block about the yaw axis of the head or block, said pivot and said stop member providing the only location points for the head or block in its operative position comprising also retracting means, means for moving said retracting means between operative and inoperative positions, and abutments on said retracting means located in the operative position spaced from the head or block but which in the movement to the inoperative position engage the head or block.

7. A mounting device as claimed in claim 6 wherein said retracting means comprises a spring frame substantially surrounding said head or block and pivotally mounted to said stationary structure.

8. A mounting device as claimed in claim 7, comprising also a spring engaging the head or block to urge it into the operative position.

9. A mounting device for a flying head or block, comprising stationary structure providing a universal pivot on which a head or block may be mounted, a stop member mounted on said stationary structure positioned to engage the head or block in the yaw direction of the head or block, a spring frame substantially surrounding the head or block and secured at one edge to the stationary structure, means for bending the spring frame about said one edge between operative and inoperative positions, and abutments on said spring frame located spaced from the head or block in the operative position but engaging the head or block in movement to the inoperative position so as to pivot the head or block about said universal pivot to an inoperative position.

10. A mounting device as claimed in claim 9, including means for adjusting the location of the spring frame along said secured edge relative to the stationary structure.

* * * * *